(12) United States Patent
Verger (10) Patent No.: US 9,500,258 B2
(45) Date of Patent: Nov. 22, 2016

(54) PNEUMATIC SUPPORT

(71) Applicant: ANVIS SD FRANCE SAS, Decize (FR)

(72) Inventor: Serge Verger, La Machine (FR)

(73) Assignee: ANVIS SD FRANCE SAS, Decize (FR)

( * ) Notice: Subject to any disclaimer, the term of this patent is extended or adjusted under 35 U.S.C. 154(b) by 0 days.

(21) Appl. No.: 14/438,252

(22) PCT Filed: Oct. 23, 2013

(86) PCT No.: PCT/FR2013/052531
§ 371 (c)(1),
(2) Date: Apr. 24, 2015

(87) PCT Pub. No.: WO2014/064384
PCT Pub. Date: May 1, 2014

(65) Prior Publication Data
US 2015/0276009 A1    Oct. 1, 2015

(30) Foreign Application Priority Data
Oct. 24, 2012 (FR) .................................. 12 60142

(51) Int. Cl.
*F16F 5/00* (2006.01)
*F16F 13/20* (2006.01)

(52) U.S. Cl.
CPC ...................................... *F16F 13/20* (2013.01)

(58) Field of Classification Search
CPC ........ F16F 13/20; F16F 13/08; F16F 13/106; F16F 9/0454; B60G 11/22
USPC ........ 267/140.11, 140.13, 64.11, 64.27, 153, 267/292–294; 248/636, 638
See application file for complete search history.

(56) References Cited

U.S. PATENT DOCUMENTS

| 3,323,786 A * | 6/1967 | Boschi | ................... B60G 11/22 16/44 |
| 4,392,639 A * | 7/1983 | Konishi | ................... F16F 13/08 248/562 |

(Continued)

FOREIGN PATENT DOCUMENTS

| DE | 19952638 A1 | 4/2001 |
| DE | 102004008401 A1 | 9/2005 |

(Continued)

OTHER PUBLICATIONS

International Search Report, dated Jan. 7, 2014, from corresponding PCT application.

*Primary Examiner* — Pamela Rodriguez
(74) *Attorney, Agent, or Firm* — Young & Thompson (57) ABSTRACT

A pneumatic support includes first and second carrier elements, and first and second spring elements. Two middle transverse faces of the first and second spring elements are opposite each other and form a first working chamber and the opposite transverse face and the portion of the transverse wall are opposite each other and form a second chamber. A first hole provides communication between the first working chamber and the outside atmosphere and a second hole in the portion of the transverse wall provides communication between the second chamber and the outside atmosphere. The second spring element has low rigidity and an overall thickness that varies in a ratio of 1 to 2 and, at rest, the middle transverse face is separated from the middle transverse face of the first spring element, whereas the opposite transverse face is separated from the inner face of the portion of the transverse wall.

17 Claims, 3 Drawing Sheets

(56) References Cited

U.S. PATENT DOCUMENTS

| | | |
|---|---|---|
| 4,407,494 A | 10/1983 | Hummel |
| 4,526,870 A | 7/1985 | Muller |
| 4,564,177 A * | 1/1986 | Leonard ................ F16F 9/0454 267/35 |
| 4,700,931 A | 10/1987 | Eberhard et al. |
| 6,902,156 B2 | 6/2005 | Muramatsu et al. |
| 7,341,244 B1 | 3/2008 | Adams |
| 8,348,250 B2 * | 1/2013 | Hofmann ................ F16F 13/20 267/140.13 |
| 2001/0001012 A1 | 5/2001 | Culli et al. |
| 2007/0090578 A1 * | 4/2007 | Muraoka ............... F16F 13/106 267/140.11 |
| 2009/0266333 A1 | 10/2009 | Kim et al. |
| 2009/0309279 A1 | 12/2009 | Kim et al. |
| 2010/0001447 A1 | 1/2010 | Kim et al. |
| 2010/0025901 A1 | 2/2010 | Hofmann et al. |
| 2010/0025902 A1 | 2/2010 | Hofmann et al. |
| 2010/0140857 A1 | 6/2010 | Kim et al. |
| 2011/0042873 A1 | 2/2011 | Yamamoto et al. |

FOREIGN PATENT DOCUMENTS

| | | |
|---|---|---|
| EP | 2141381 A2 | 1/2010 |
| FR | 1492211 A | 8/1967 |
| JP | 58131564 A | 5/1983 |
| KR | 2011053648 A | 5/2011 |
| KR | 20110106072 A | 9/2011 |
| WO | 2008015247 A1 | 2/2008 |

* cited by examiner

PNEUMATIC SUPPORT

BACKGROUND OF THE INVENTION

1. Field of the Invention

The invention relates to the field of pneumatic supports, such as those implemented in various machines, more particularly vehicle engines.

2. Description of the Related Art

In the first place, it should be mentioned that such pneumatic supports may be referred to by different terms depending on the manufacturers, for example, but that this list is not exhaustive: pneumatic damping devices, vibration-damping supports, air springs, vibration absorbers, shock absorbers, etc. The term "pneumatic support" used here must be considered as referring to the same thing as what is designated by the other mentioned expressions, i.e. a device interposed between and made integral with a first part such as a carrier structure and a second part such as a driving system, intended to limit the vibrations liable to be transmitted between the parts, one of which at least is moving or can be moved, and specifically can vibrate. Thus, the term "pneumatic support", as such, is not limitative.

It is common knowledge that such pneumatic supports are commonly used. They are also the subject of a number of achievements, such as those disclosed in documents EP 2141381, KR 2011 106072, KR 20110 53648, U.S. 2011/10042873, U.S. Pat. No. 6,902,156, U.S. Pat. No. 4,407,494, U.S. Pat. No. 4,700,931, U.S. 2010/0001447, JP 57160716, DE 19952638, DE 102004008401, WO 2008/015247, U.S. 2009/0266333, U.S. 2009/0309279, U.S. 2010/0140857, U.S. 2001/01012 and U.S. 2010/0025901.

More specifically, the document U.S. 2010/0025902 or other similar documents describe such a pneumatically damping mount comprising a first carrier means adapted to secure the rigid connection of the pneumatic support to one of the two parts, a second carrier means adapted to ensure the rigid connection of the pneumatic mount to the other part, a first spring means and a second spring means.

The first carrier means comprises a rigid wall having with a side portion provided with a large opening and, an opposite transverse portion provided with one or more small opening(s), and defines a cavity having on one side the large opening and on the other side the small opening(s).

The first spring means, which comprises an elastomeric material, is interposed between and made rigidly integral, toward its side periphery, with the side portion of the wall of the first carrier means towards the large opening, and toward its outer transverse periphery with the second support means. It has a middle transverse face oriented toward and separated from the transverse portion of the wall of the first carrier means.

The second spring means, which also comprises an elastomeric material, is made rigidly integral, toward its side periphery, with the side portion of the wall of the first carrying means, toward its transverse portion. It has a middle transverse face and an opposite face positioned opposite the transverse portion of the wall of the first carrier means. According to the document U.S. 2010/0025902, such opposite face has undulations with recesses and protrusions, with the protrusions being in contact with the transverse portion of the wall of the first carrier means.

The two middle transverse faces of the first spring means and the second spring means are positioned opposite each other and provide a first deformable working chamber adapted to receive a gas, particularly atmospheric air, whereas what the document U.S. 2010/0025902 calls a second "working chamber" is provided between the opposite contacting faces, i.e. the opposite face of the second spring means, which is not flat but instead significantly undulated with recesses and protrusions, and the inner face of the transverse portion of the wall of the first carrier means.

A hole is provided in the second spring means, so as to provide communication between the first working chamber on one side, and the small opening(s) and thus the atmospheric air on the other side.

The document U.S. 2010/0025902 and in particular its force/displacement graph, demonstrates that the first working chamber is the important element. It is active when its volume is positive and remains active when its volume decreases and possibly reaches zero when the two middle transverse faces of the first and second spring-forming members are in contact with and pressed against each other. As mentioned, if additional pressure is then applied, the second spring means is compressed. Further deformation is then obtained. As a matter of fact, the second working chamber makes it possible to increase the elasticity of the second spring means when pressure is applied thereto.

It appeared to the applicant that a second spring means which, first, has a so-called "opposite face" (i.e. a face positioned opposite the transverse portion of the wall of the first carrier means) which does not extend along a general transverse direction since it has significant undulations with recesses and protrusions, with the protrusions being in contact with the transverse portion of the wall of the first carrier means, secondly has a thickness varying over a wide range (i.e. a thickness varying from one to three according to the figures in document U.S. 2010/0025902), affects the performance of the pneumatic support, particularly as regards damping because, when the volume of the first chamber is null because the two middle transverse faces of the first and second spring-forming members are in contact with and pressed against each other, the movement of the second spring means causes a very high variation of the force.

The document FR 1492 121 aims at a shock and vibration absorbing device between two elements such as frames or parts, comprising a housing integral with one of the elements, on the bottom of which an elastic membrane, so-called a carrier membrane, is provided and inside which a second antagonistic membrane integral with the second element is provided, in particular having the characteristic consisting in that, to improve the damping characteristics, the carrier membrane is provided with at least one hole and the side wall of the housing is provided with at least one hole in its part located between the two membranes, with such holes having a small diameter.

The document U.S. Pat. No. 7,341,244 relates to a hydraulic anti-vibration support comprising an elastomer spring body which connects a first rigid strength member and a second rigid strength member. The first rigid strength member includes a piston which comprises a rod terminated by an end member, and the second rigid strength member has an opening which is gone through by said piston. A liquid-filled module is mounted inside a housing which is secured to the second rigid strength member, and includes a working chamber defined in part by a substantially dome-shaped elastomer wall which has a central area in contact with the end member of the piston without any mechanical securing.

There is therefore a need for pneumatic supports of the type previously mentioned which do not have such drawbacks. This is the problem underlying the invention. As a matter of fact, the issue consists in limiting the volume without being in saturation, so as to have a limited volume in the area of deformation within a given range and a second chamber which takes over to still have edge.

SUMMARY OF THE INVENTION

A description of the invention as characterized in the claims is given hereunder.

The object of the invention is a pneumatic support, particularly for a machine, being interposed between and integral with a first part such as a supporting structure and a second part such as a driving device, so that:
- a first rigid carrier means is able to ensure the rigid connection of the pneumatic support with one of the two parts and comprises a portion of a side wall and a portion of a transverse wall and a second rigid carrier means is able to ensure the rigid connection of the pneumatic support with the other part,
- a first spring means comprising an elastomer material, is interposed between and made rigidly integral, toward its side periphery, with the portion of the side wall, and toward its middle periphery, with the second carrier means, and has a middle transverse face oriented toward the portion of transverse wall,
- a second spring means comprising an elastomer material, is made rigidly integral, toward its side periphery, with the portion of the side wall, and has a middle transverse face and an opposite transverse face,
- the two middle transverse faces of the first and second spring means are opposite each other and provide a first deformable working chamber, whereas the opposite transverse face and the portion of the transverse wall are opposite each other and provide a second chamber,
- a first hole provides communication between the first working chamber and the outside atmosphere and a second hole formed in the portion of the transverse wall provides communication between the second chamber and the outside atmosphere.

Such pneumatic support is more particularly characterized in that:
- the second spring means has a low rigidity and has, between its middle transverse face and the opposite transverse face which are globally flat, an overall thickness which varies at most in the ratio of 1 to 2, and at rest, said middle transverse face is separated from the middle transverse face of the first spring means, whereas the opposite transverse face is separated from the inner face of the portion of the transverse wall,
- in the case of dynamic deformation of the second spring means having an amplitude below a lower limit, said middle transverse face is in a free state where it is separated from the middle transverse face of the first spring means, whereas the opposite face is in a free state where it is separated from the inner face of the portion of the transverse wall,
- in the case of dynamic deformation between the lower limit and an upper limit, said middle transverse face is in a secured state where it is in abutting contact with the middle transverse face of the first spring means, whereas the opposite transverse face is in the free state,
- in the case of dynamic deformation exceeding the upper limit, said middle transverse face is in a secured state and the opposite face is in a secured state where it is in abutting contact with the inner face of the portion of the transverse wall.

According to one characteristic, the second chamber is a continuous space defined by at least the inner face of the portion of the transverse wall and the opposite face of the second spring means.

According to one characteristic, the second spring means in the free state can be deformed and move without constraint as it has no contact with said inner face of the portion of the transverse wall.

According to one embodiment, in its free state, the second spring means has a globally slightly curved middle transverse face the concavity of which is oriented towards the opposite face, and a globally flat opposite face.

According to one embodiment, the inner face of the portion of the transverse wall is flat and globally slightly curved and has a concavity oriented towards the second spring means.

According to one embodiment, the middle transverse face of the first spring means is flat and globally slightly curved and has a concavity oriented towards the second spring means.

According to one embodiment, the lower limit is equal or close to 3 mm and the upper limit is equal or close to 5 mm.

According to two embodiments, the first hole is formed in the second spring means or the first hole is formed at least in the first spring means.

The advantages of the invention are disclosed hereafter with respect to the state of the prior art. The issue consists in limiting the volume of air (compressibility of the air) using a deformable element with no limitation of large deformations, enabling a contribution to the damping for the very large deformations thanks to the second chamber, and eventually obtaining a progressive saturation by the deformable member.

BRIEF DESCRIPTION OF THE DRAWING FIGURES

The Figures of the drawings will now be briefly described.

DETAILED DESCRIPTION OF THE INVENTION

A detailed review of several embodiments of the invention illustrated by examples and referring to the drawings is given hereunder.

The object of the invention is a pneumatic support 1 which, as already mentioned, is intended for a machine wherein it is interposed between and integral with a first part such as a supporting structure and a second part such as a driving device. This machine is for example a vehicle engine. Such first part and such second part are not the object of the invention, nor the means for making the pneumatic support integral with such two parts. Neither the first part, nor the second part, is thus shown in the drawings.

This pneumatic support 1 is intended to limit the vibrations which might be transmitted between the two parts, at least one of which is in motion or can be moved, specifically vibrate. It should be understood that this is the essential function performed.

The pneumatic support 1 is in the form of a unit assembly having a first axis 1$a$ perpendicular to the planes of FIGS. 1 to 5 and a second axis 1$b$, in the planes of FIGS. 1 to 5, and said second axis 1$b$ is an axis of symmetry, as well as the plane defined by the axes 1$a$ and 1$b$, the outline of which on the planes of the figures is the second axis 1$b$. In one embodiment, the pneumatic support 1 is globally so arranged as to revolve around the second axis 1$b$. In another embodiment, it extends in the direction of the axis 1$a$, while being symmetrical to the plane defined by the axes 1$a$ and 1$b$.

The pneumatic support 1 comprises a first rigid carrier means 2, able to ensure the rigid connection of the pneumatic support 1 with one of the two parts of the machine, and a second carrier means 3, rigid too, and able to ensure the rigid connection of the pneumatic support to the other part of the machine. For this purpose, the first carrier means 2 and the second carrier means 3 are provided with appropriate rigid connection members such as flanges, male connection members and female connection members. The first carrier means 2 is located in its entirety toward a first side A of the second axis 1$b$ (here, at the bottom of the figures) and the second carrier means 3 is located in its entirety toward a second side B of the second axis 1$b$ (here, at the top of the figures).

The terms "first" and "second" make it possible to differentiate two means, members, parts, more or less similar in nature or function, as well as the axes. It should be understood that, for all that, such two means, members, parts are different, each one having its own characteristics. The term "first" or "second" is assigned to the means, member, part, axis, depending on whether it is cited either for the first time in this detailed disclosure of the invention or it is cited when a first means, member, part, axis has already been mentioned. As a result, there is no reason to match in any way whatsoever such first means member, part, axis with such other first means, member, part, axis or such second means, member, part, axis with such other second means, member, part, axis or to match all first means, members, parts with one another or all second means, members, parts with one another, which does not exclude that a first means, member, part and a second means, member, part may have some common structural and/or functional characteristics.

The pneumatic support 1 further comprises a first spring means 4 and a second spring means 5, both comprising an elastomeric material, so that the elastomeric material of the first spring means 4 is as damping as possible so as to damp the vibrations while having a damping-stiffening compromise so as not to affect the acoustics and a damping-creep compromise so as to avoid an excessive static variation when loaded. The elastomeric material of the second spring means 5 is as damping as possible so as to make it possible to increase the phase (to enhance damping) as it is placed in series between the two carrier means.

The pneumatic support 1 also includes a first deformable working chamber 6 and a second, also deformable, working chamber 7. Such chambers are intended to receive the same gas under the same pressure (conventionally referred to in the text by "outside atmosphere"). For example, it may be atmospheric air.

The pneumatic support 1 also comprises a first hole 8 which provides communication between the first working chamber 6 and the outside atmosphere and a second hole 9 which provides communication between the second chamber and the outside atmosphere.

The first carrier means 2 may comprise a portion of side wall 10 and a portion of transverse wall 11 forming a cavity 12 having a large opening 13 on one side, and the second hole 9 formed in the portion of transverse wall 11 on the other side.

The term "side" generally refers to what is generally located on the side relative to the second axis 1$b$. In the case of a global revolution pneumatic support 1, the term side more exactly means annular.

The word "transverse" generally refers to what cuts the second axis 1$b$, in particular what is globally orthogonal to the second axis 1$b$.

The first carrier means 2, as such, may be the subject of various alternative embodiments, for example it may be one piece or consist of several parts assembled and joined together.

In the embodiment shown in the drawings, the first carrier means 2 comprises, in its portion of side wall 10, seats 14 for the lateral periphery 15 of the second spring means 5 which is clamped and thus held.

Other embodiments of the first carrier means 2 may be considered.

The same is true for the second carrier means 3.

In the embodiment shown in the drawings, the second carrier means 3 is a block having a massive shape which is inserted into a first holding portion 4$a$ of the first spring means 4 which, in the case of a revolution pneumatic support 1, may have a generally annular shape. The first spring means 4 is thus held by the second carrier means 3. On the other hand, the first spring means 4 comprises a second holding portion 4$b$ to the first carrier means 2, close to the side periphery 15 of the second spring means 5, toward the end of the portion of side wall 10 defining the large opening 13, opposite the portion of transverse wall 11.

As mentioned, the first spring means 4 is interposed between and made integral with on the one hand—toward its side periphery—and through the second holding portion 4$b$ to the portion of side wall 10 and thus to the first carrier means 2 and, on the other hand, toward its middle periphery—and by means of the first holding portion 4$a$—to the second carrier means 3.

The first spring means 4 has a middle transverse face 16 oriented toward the first side A and the second spring means 5 and the portion of transverse wall 11. According to one embodiment, such middle transverse face 16 is flat and globally slightly curved and has a concavity oriented towards the second spring means 5 and the portion of transverse wall 11.

On its opposite transverse face 17 oriented towards the second side B, the first spring means 4 is associated with the transverse face 18 of the second carrier means 3.

The term "middle" refers to what is globally between the first side of the second axis 1b toward which the first carrier means 2 is mainly located and the second side of the second axis 1b toward which the second carrier means 3 is mainly located.

The first spring means 4 has a fairly substantial mass, and its thickness too is fairly substantial, too. It extends both in the direction of the second axis 1b and transversely.

The second spring means 5 has a middle transverse face 19 and an opposite transverse face 20.

The term "opposite" applied to the transverse face 20 means that this face is located on the other side of the second spring means 5 than the middle transverse face 19.

The middle transverse face 19 is directed towards the first side A and the first support means 2.

The opposite transverse face 20 is directed toward the second side portion B and the transverse wall 11.

The two middle transverse faces 16 and 19 of the first and second spring means 4 and 5 are opposite each other and so arranged as to define the first working chamber 6.

The opposite transverse face 20 of the second spring means 5 and the portion of transverse wall 11 are opposite each other and so arranged as to define the second chamber 7.

The first hole 8 and the second hole 9 extend at least partially axially parallel to the second axis 1b.

Such holes 8 and 9 are through holes on both sides. Each one is a single elementary hole or on the contrary, comprises several elementary holes.

According to the embodiment shown in FIGS. 1 to 4, the first hole 8 is formed in the second spring means 5 and extends between its middle transverse face and its opposite transverse face 20 whereon it opens.

Figure 5:
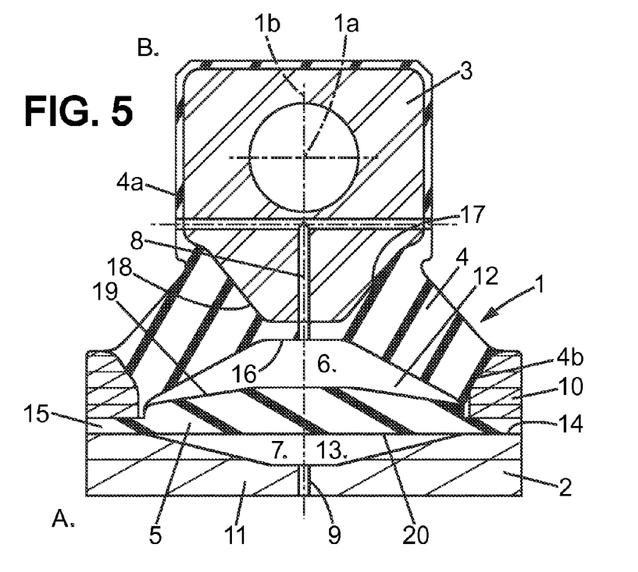
FIG. 5 is a view similar to FIG. 1 of a second embodiment of a pneumatic support according to the invention, wherein the first hole is formed in the first spring means, with the pneumatic support being at rest.
Figure 6:
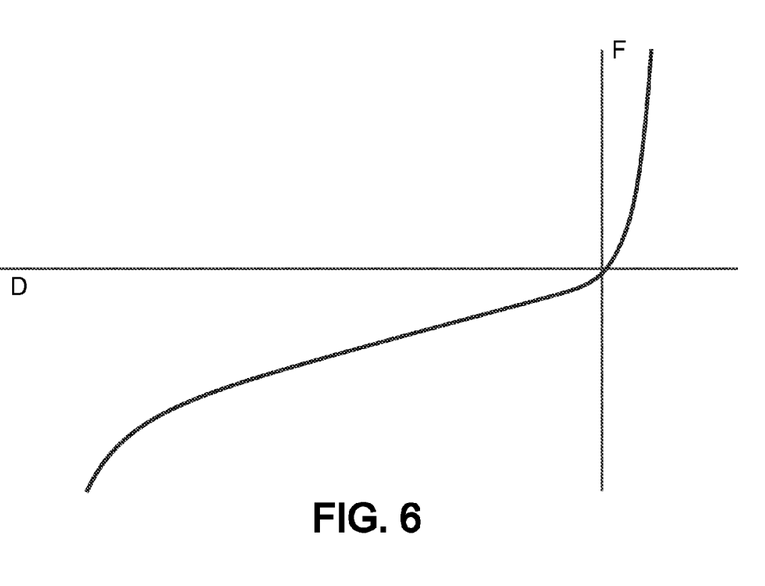
FIG. 6 is an abscissa/ordinate graph of the force F (ordinate) versus the displacement D (abscissa).

According to the embodiment shown in FIG. 5, the first hole 8 is formed in the first spring means 4 whereon it opens in the middle transverse face 16. It is also formed in the second part 3 and opens into the outside atmosphere.

The second spring means 5 has a low rigidity.

The middle transverse face 19 and the opposite transverse face 20 of the second spring means 5 are generally flat. It should be understood by this that they have no marked relief such as undulations with recesses and protrusions.

According to one embodiment such as the one illustrated in the drawings, the inner face of the portion of transverse wall 11 is flat and generally slightly curved with a concavity oriented towards the second spring means 5.

The second spring means 5 has, between the middle transverse face 19 and the opposite transverse face 20, an overall thickness which varies slightly, for example at most in the ratio of 1 to 2, but which may vary in a smaller ratio more such as 1 to about 1.5.

When the second spring means 5 is at rest, its middle transverse face 19 is separated from the middle transverse face 16 of the first spring means 5, with the first working chamber 6 having a certain volume. In this situation, the opposite transverse face 20 of the second spring means 5 is separated from the inner face of the portion of transverse wall 11, with the second working chamber 7 having a certain volume. The second working chamber 7 is thus a continuous space defined by at least the inner face of the portion of the transverse wall 11 and the opposite transverse face 20 of the second spring means 5.

The pneumatic support 1 is further characterized by the configuration it takes further to a dynamic deformation of the second spring means 5, and more specifically according to the amplitude of such deformation. In this regard, as far as the amplitude of the elastic deformation is concerned, a lower limit $B_i$, and an upper limit $B_s$ of course larger than the lower limit $B_i$ are defined.

For example, in the case of a pneumatic support 1 intended for a vehicle engine, the lower limit $B_i$ may be equal or close to 3 mm and the upper limit $B_s$ may be equal to or close to 5 mm.

Figure 1:
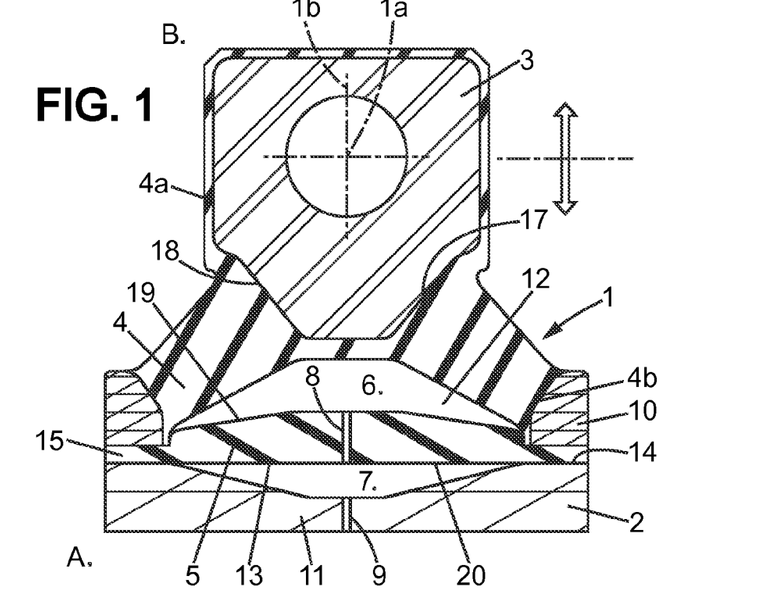
FIG. 1 is a cross-sectional view of a first embodiment of a pneumatic support according to the invention, wherein the first hole is formed in the second spring means, with the pneumatic support being at rest with the middle transverse face of the second spring means being separated from the middle transverse face of the first spring means and the opposite face of the second spring means being separated from the inner face of the portion of the transverse wall of the first support means.
Figure 2:
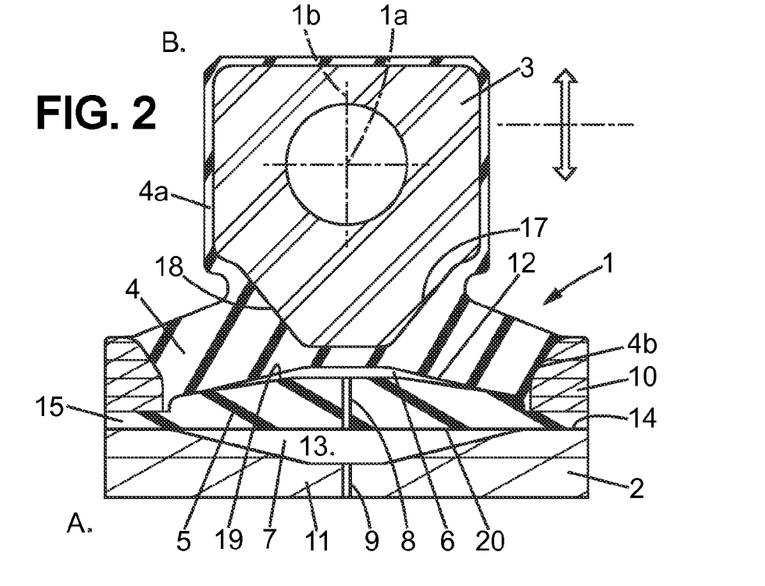
FIG. 2 is a view similar to FIG. 1, and illustrates the case of a dynamic deformation of the second spring means having an amplitude below a lower limit, with said middle transverse face being in a free state where it is separated from the middle transverse face of the first spring means, whereas the opposite face is in a free state where it is separated from the inner face of the portion of the transverse wall.

In case of dynamic deformation of the second spring means 5 having an amplitude below the lower limit $B_i$, the middle transverse face 19 and its opposite transverse face 20 are, respectively, in a state conventionally called a "free state". Such configuration is shown in FIG. 2.

In its free state, the middle transverse face 19 of the second spring means 5 is separated from the middle transverse face 16 of the first spring means 4.

In its free state, the opposite transverse face 20 of the second spring means 5 is separated from the inner face of the portion of transverse wall 11 of the first support means 2.

Figure 3:
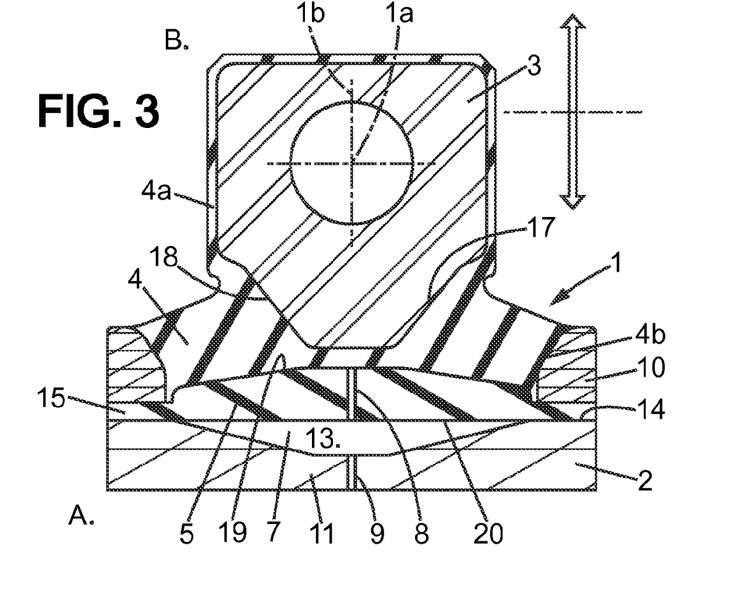
FIG. 3 is a view similar to FIGS. 1 and 2, and illustrates the case of a dynamic deformation between the lower limit and an upper limit, said middle transverse face is in a secured state where it is in abutting contact with the middle transverse face of the first spring means, whereas the opposite face is in the free state.

In case of dynamic deformation of the second spring means 5 having an amplitude between the lower limit $B_i$, and the upper limit $B_s$, the middle transverse face 19 is in a state conventionally called "secured" state, and the opposite transverse face 20 is in the same free state as previously. Such configuration is shown in FIG. 3.

In the secured state, the middle transverse face 19 is in abutting contact with the middle transverse face 16 of the first spring means 4.

Figure 4:
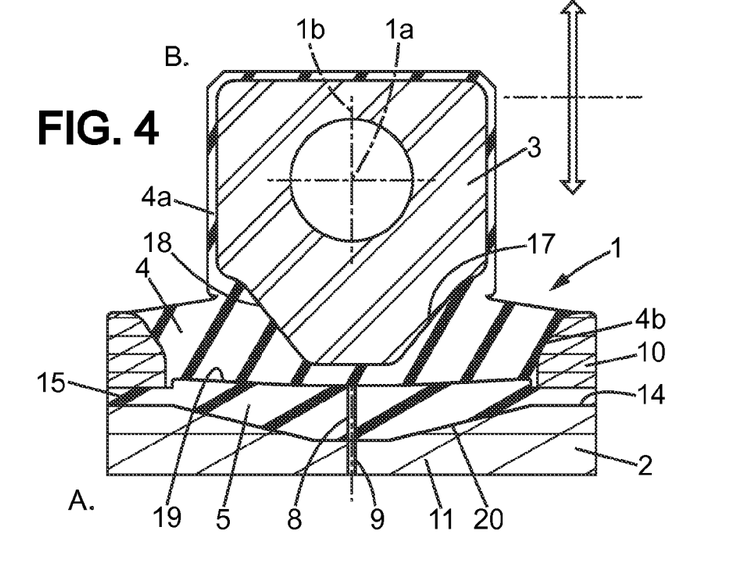
FIG. 4 is a view similar to FIGS. 1 to 3, and illustrates the case of a dynamic deformation, in the case of a dynamic deformation above the upper limit, with said middle transverse face being in a secured state and the opposite face being in a secured state where it is in abutting contact with the inner face of the portion of the transverse wall.

In case of dynamic deformation of the second spring means 5 having an amplitude above the upper limit $B_s$, the middle transverse face 19 and the opposite transverse face 20 are, respectively, in the secured state. Such configuration is shown in FIG. 4.

In the secured state, the opposite transverse face 20 is in abutting contact with the inner face of the portion of transverse wall 11 of the first support means 2.

The second spring means 5, when in the free state, thus can be deformed and move without constraint, as it has no contact with the inner face of portion of the transverse wall 11 of the first support means 2.

In one embodiment, the second spring means 5 has, in its free state, a globally slightly curved middle transverse face 19 with a concavity oriented towards the opposite transverse face 20, i.e. with a convexity oriented towards the middle transverse face 16 of the first spring means 4.

In addition, according to one embodiment, the second spring means 5 has, in its free state, a globally flat opposite transverse face 20.

The second spring means 5 which is deformable and has a low rigidity makes it possible to obtain large deformations of the first spring means 4 without affecting the curve of rigidity of the first spring means 4 while limiting as much as possible the volume of air in the first working chamber 6.

For dynamic deformations of a small amplitude (<3 mm, for example) the second calibrated hole 9 makes it possible to increase pressure in the second working chamber 7, which results in reducing the deformation of the second spring means 5 under the pressure of the first working chamber 6, and thus increasing the phase created by the passage of air from the first working chamber 6 through the first calibrated hole 8.

For dynamic deformations of higher amplitudes (>3 mm and <5 mm, for example), the first spring means 4 is in contact with the second spring means 5. The second working chamber 7 makes it possible to obtain a shifting of phase by the passage through the second calibrated hole 9.

For large deformations (>5 mm, for example), the second spring means 5 comes in contact with the first carrier means 2 which makes it possible to obtain a progressive saturation (limitation).

The invention claimed is:

1. A pneumatic support (1), for a machine, being interposed between and integral with a first part of a supporting structure and a second part of a driving device, so that:
   a first rigid carrier means (2) is able to ensure a rigid connection of the pneumatic support with one of such two parts comprises a portion of a side wall and a portion of a transverse wall (11) and a second rigid carrier means (3) is able to ensure the rigid connection of the pneumatic support with the other part,
   a first spring means (4) comprising an elastomeric material, is interposed between and made rigidly integral, toward its side periphery, with the portion of the side wall and toward its middle periphery with the second carrier means (3), and has a middle transverse face (16) oriented toward the portion of the transverse wall (11),
   a second spring means (5) comprising an elastomeric material, is made rigidly integral toward its side periphery, with the portion of the side wall, and has a middle transverse face (19) and an opposite transverse face (20),
   the two middle transverse faces (16, 19) of the first and second spring means (4, 5) are opposite each other and provide a first deformable working chamber (6), whereas the opposite transverse face (20) and the portion of the transverse wall (11) are opposite each other and provide a second chamber (7),
   a first hole (8) provides communication between the first working chamber (6) and the outside atmosphere and a second hole (9) formed in the portion of the transverse wall provides communication between the second chamber (7) and the outside atmosphere,
   wherein
   the second spring means (5) has a low rigidity and has, between the middle transverse face (19) of the second spring means (5) and the opposite transverse face (20) which are globally flat, an overall thickness which varies at most in the ratio of 1 to 2, and at rest, said middle transverse face (19) of the second spring means (5) is separated from the middle transverse face (16) of the first spring means (4), whereas the opposite transverse face (20) is separated from the inner face of the portion of the transverse wall (11),
   in case of dynamic deformation of the second spring means (5) having an amplitude below a lower limit, said middle transverse face (19) of the second spring means (5) is in a free state where it is separated from the middle transverse face (16) of the first spring means (4), whereas the opposite transverse face (20) is in a free state where it is separated from the inner face of the portion of the transverse wall (11),
   in case of dynamic deformation between the lower limit and an upper limit, said middle transverse face (19) of the second spring means (5) is in a secured state where it is in abutting contact with the middle transverse face (16) of the first spring means (4), whereas the opposite transverse face (20) is in the free state,
   in case of dynamic deformation exceeding the upper limit, said middle transverse face (19) of the second spring means (5) is in a secured state and the opposite transverse face (20) is in a state where it is in abutting contact with an inner face of the portion of the transverse wall (11).

2. The pneumatic support (1) according to claim 1, wherein the second chamber (7) is a continuous space defined by at least the inner face of the portion of the transverse wall (11) and the opposite transverse face (20) of the second spring means (5).

3. The pneumatic support (1) according to claim 2, wherein the second spring means (5) in the free state can be deformed and moved without constraint as it has no contact with said inner face of the portion of the transverse wall (11).

4. The pneumatic support (1) according to claim 2, wherein, in its free state, the second spring means (5) has a globally slightly curved middle transverse face (19), the concavity of which is oriented towards the opposite transverse face (20), and a globally flat opposite transverse face (20).

5. The pneumatic support (1) according to claim 2, wherein the inner face of the portion of the transverse wall (11) is flat and globally slightly curved and has a concavity oriented towards the second spring means (5).

6. The pneumatic support (1) according to claim 2, wherein the middle transverse face (16) of the first spring means (4) is flat and globally slightly curved and has a concavity oriented towards the second spring means (5).

7. The pneumatic support (1) according to claim 2, wherein the lower limit is equal or close to 3 mm and the upper limit is equal or close to 5 mm.

8. The pneumatic support (1) according to claim 2, wherein the first hole (8) is formed in the second spring means (5).

9. The pneumatic support (1) according to claim 2, wherein the first hole (8) is formed at least in the first spring means (4).

10. The pneumatic support (1) according to claim 1, wherein the second spring means (5) in the free state can be deformed and moved without constraint as it has no contact with said inner face of the portion of the transverse wall (11).

11. The pneumatic support (1) according to claim 10, wherein, in its free state, the second spring means (5) has a globally slightly curved middle transverse face (19), the concavity of which is oriented towards the opposite transverse face (20), and a globally flat opposite transverse face (20).

12. The pneumatic support (1) according to claim 1, wherein, in its free state, the second spring means (5) has a globally slightly curved middle transverse face (19), the concavity of which is oriented towards the opposite transverse face (20), and a globally flat opposite transverse face (20).

13. The pneumatic support (1) according to claim 1, wherein the inner face of the portion of the transverse wall (11) is flat and globally slightly curved and has a concavity oriented towards the second spring means (5).

14. The pneumatic support (1) according to claim 1, wherein the middle transverse face (16) of the first spring means (4) is flat and globally slightly curved and has a concavity oriented towards the second spring means (5).

15. The pneumatic support (1) according to claim 1, wherein the lower limit is equal or close to 3 mm and the upper limit is equal or close to 5 mm.

16. The pneumatic support (1) according to claim 1, wherein the first hole (8) is formed in the second spring means (5).

17. The pneumatic support (1) according to claim 1, wherein the first hole (8) is formed at least in the first spring means (4).

\* \* \* \* \*